United States Patent [19]
Hale

[11] 3,930,428
[45] Jan. 6, 1976

[54] THEFT RESISTANT COMBINATION LUG NUT APPARATUS

[76] Inventor: Arthur Duane Hale, 74 Eastfield, Rolling Hills, Calif. 90274

[22] Filed: Jan. 27, 1975

[21] Appl. No.: 544,310

Related U.S. Application Data

[63] Continuation of Ser. No. 338,345, March 5, 1973, abandoned.

[52] U.S. Cl. .................................. 81/121 R; 85/35
[51] Int. Cl.² ...................... B25B 13/06; F16B 37/00
[58] Field of Search .... 81/90 B, 120, 121 R, 121 A, 81/121 B; 85/35, 45, 53

[56] References Cited
UNITED STATES PATENTS

| | | | |
|---|---|---|---|
| 1,447,564 | 3/1923 | Norlund et al. | 81/121 R X |
| 3,364,806 | 1/1968 | Chaivre | 85/35 |
| 3,874,258 | 4/1975 | Senola et al. | 81/121 R |

FOREIGN PATENTS OR APPLICATIONS

| | | | |
|---|---|---|---|
| 814,781 | 6/1959 | United Kingdom | 81/121 R |

*Primary Examiner*—Al Lawrence Smith
*Assistant Examiner*—James G. Smith
*Attorney, Agent, or Firm*—Fulwider, Patton, Rieber, Lee & Utecht

[57] ABSTRACT

Theft resistant combination lug nut apparatus including a nut formed with an internally threaded annular bearing ring formed on one end with a radially extending shoulder, such nut projecting axially outwardly from such ring to form a conical axially elongated centering dome. The bearing ring is formed with a plurality of diametrically unopposed radially outwardly facing chordal index facets arranged in a pattern defining a selected combination and extending axially along the periphery of the ring and spaced to form, at locations opposite all such facets, rounded slip surfaces. A key device is formed with an open ended shell defining a cylindrical socket for closely overfitting the slip surfaces of such bearing ring and is formed on its interior with a plurality of index surfaces arranged in a pattern to closely fit over the facets on such ring whereby the key device may be telescoped axially over such centering dome to be aligned axially with the ring and then rotated to register the key surfaces with the respective facets and then slid axially onto such ring so rotative forces can be applied thereto and only tangential forces will be applied to such facets.

6 Claims, 4 Drawing Figures

U.S. Patent   Jan. 6, 1976   3,930,428
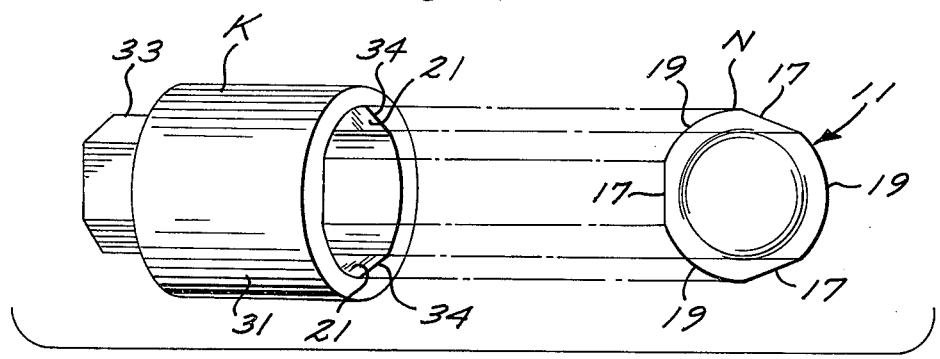
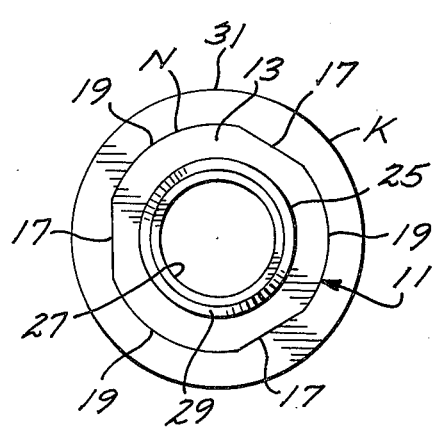
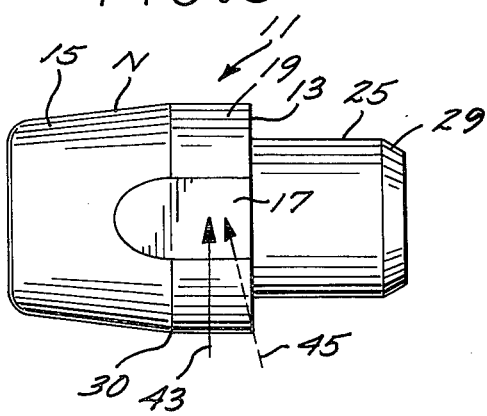
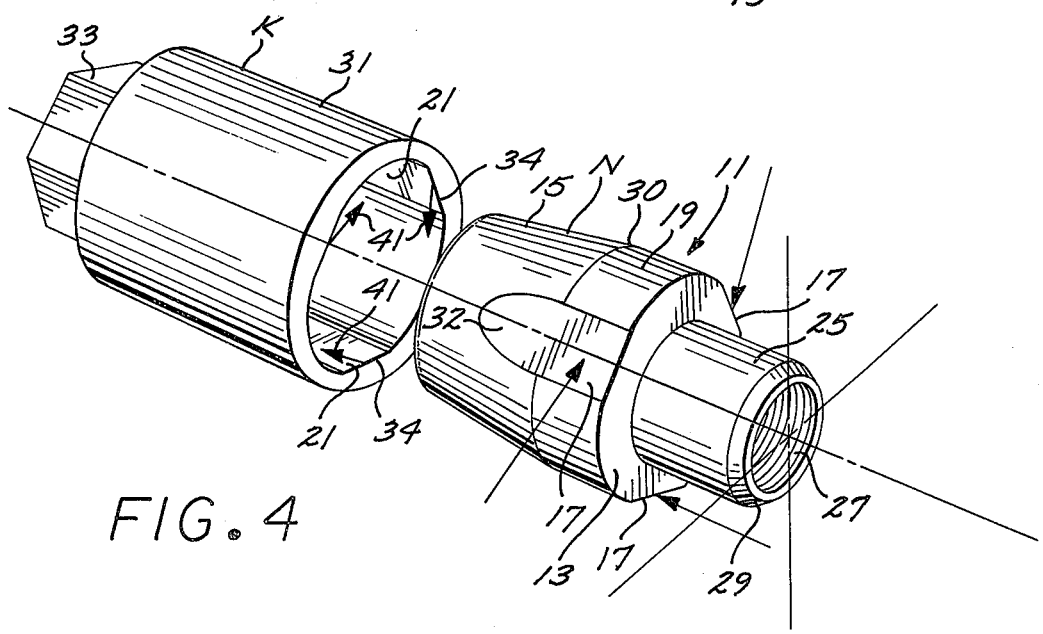

THEFT RESISTANT COMBINATION LUG NUT APPARATUS

CROSS REFERENCE TO RELATED APPLICATION

This application is a continuation of application Ser. No. 338,345, filed Mar. 5, 1973, and now abandoned.

BACKGROUND OF THE INVENTION

1. Field of the Invention:

The theft resistant combination lug nut apparatus of the present invention relates to a nut for locking a tire rim to a wheel and which requires a special key device for removal thereof.

2. Description of the Prior Art:

As disclosed in my parent application, with the polularity of relatively expensive custom-made tire rims, many efforts have been made to provide a convenient means for locking such rims to the wheel but which provide for convenient and rapid removal thereof in the advent of a flat tire on such rim, thus necessitating replacement thereof by a spare tire. Since flat tires are frequently experienced in darkness and in inclement conditions, it is important that any key device to be used on a combination lug nut be easily fitted thereon with a minimum of inconvenience and tend to remain engaged with the nut during tightening thereof to avoid disengagement and consequent cracking of the operator's knuckles. Many efforts have been made to solve this problem and one such effort led to the proposal of a cylindrical nut having axially extending and radially outwardly opening grooves along one side thereof and registerable with a key device having complementarily positioned axially extending ribs formed on the interior thereof. A device of this type is shown in U.S. Pat. No. 1,447,564 and a somewhat similar groove and rib construction was shown in my parent application. However, I have learned that devices of this type suffer the shortcoming that there must be a close fit between the nut and key device, thus requiring critical axial and rotative alignment between the nut and key device in order to start the key device onto the nut and to prevent galling between the ribs and grooves during telescoping of such key device onto the nut. While a shroud may be installed over a lug nut of this type to assist in axially aligning the key device with the nut, such an arrangement would be practically unfeasible because of the inconvenience of installing such shroud and the likelihood of such shroud being deformed during use, thus preventing insertion of the key device. Obviously, acorn nuts having bell-shaped bonnets thereon are not formed with bearing rings having facets arranged in a selected pattern thereon so would present little difficulty in removal by a would-be thief.

SUMMARY OF THE INVENTION

The theft resistant combination lug nut apparatus of the present invention is characterized by a nut formed with an annular bearing ring formed with axially extending outwardly facing facets disposed in diametrically unopposed relationship and having formed therebetween rounded slip surfaces, such facets and slip surfaces being arranged such that a slip surface is disposed opposite all such facets. A conically shaped centering dome tapers axially outwardly and radially inwardly from such bearing ring to facilitate fitting thereonto of a key device formed with a socket which closely fits over such slip surfaces and is formed with index surfaces closely fitting such facets.

The objects and advantages of the present invention will become apparent from a consideration of the following detailed description when taken in conjunction with the accompanying drawing.

DESCRIPTION OF THE DRAWING

FIG. 1 is a perspective view of a key device and an end view of a combination nut incorporated in a theft resistant combination lug nut apparatus embodying the present invention;

FIG. 2 is a transverse sectional view taken through the lug nut apparatus shown in FIG. 1 with the key device and nut telescoped together;

FIG. 3 is a side view, in enlarged scale, of the nut shown in FIG. 1; and

FIG. 4 is a perspective view, in enlarged scale, of the key device shown in FIG. 1 being telescoped onto the nut device shown in FIG. 1.

DESCRIPTION OF THE PREFERRED EMBODIMENT

The theft resistant lug nut apparatus of the present invention includes, generally, a combination lug nut N which receives telescopically thereover a key device K. The lug nut N is formed with a bearing ring, generally designated 11, which defines an axially inwardly facing annular shoulder 13 and has projecting axially outwardly therefrom a conically shaped centering dome 15. Formed about the periphery of the bearing ring 11 are three spaced apart, but unopposed, flat facets 17 arranged in a pattern to provide a selected combination, the rounded surface between such flat facets forming slip surfaces 19 such that a slip surface is disposed diametrically opposite all such facets. The key device K is in the form of a cylindrical socket closely fitting the bearing ring 11 and having the interior thereof formed with flat index surfaces 21 which are registerable over the facets 17 to enable such key device to be slid progressively onto the centering dome 15 and to then be rotated on such dome while held in axial alignment with the bearing ring 11 until such facets 21 align with the respective complemental facets 17 so the key device may be slid over the bearing ring so it may be rotated to apply tangential forces to the facets 17 to tighten or loosen the lug nut N as desired.

It is necessary that the key device K is easily alignable on the bearing ring 11 and registerable with the facets 17 to enable such key device to be easily positioned thereon even in poor visibility and operating under the handicap of cold and numbed fingers. In this regard, it is important that the centering dome 15 lead such key device into axial alignment with the bearing ring 11 so the operator can easily hold such device in axial alignment while rotating it until the appropriate index surfaces 21 register with the complementary facets 17 to enable such key device to be slid down axially over the bearing ring 11. Further, it is important that the index facets be of generally flat construction to thus reduce any galling effect that may otherwise take place between such facets and the index surfaces 21. Additionally, it is also necessary that the facets 17 project axially with respect to the bearing ring 11 rather than tapering inwardly, thus eliminating the tendency of the key device K to be urged axially outwardly with respect to such bearing ring when rotative forces are applied thereto.

With the relatively soft alloys such as magnesium or aluminum used in many present day decorative wheels, it is desirable that the lug bores thereof are held out of direct contact with the lug threads themselves and to this end, such lug bores are frequently drilled out to provide oversized bores to thus provide an annular space between the walls of such bores and the receiving lug. In order to provide a shield between such lug threads and walls of the lug bores, an annular sleeve 25 is formed integrally with the bearing ring 11 and projects axially inwardly therefrom and is threaded on its interior 27 to be received over the lug (not shown). In order to facilitate alignment of such sleeve 25 within the lug bore the axially inner end thereof is chamfered at 29 to assist in leading such skirt into the bore.

As discussed in my parent application, the bearing ring is conveniently formed with a diameter of one inch to form the annular shoulder 13 of sufficient size to adequately overlie the periphery of the lug bore. The ring 11 itself is 5/16 of an inch long and the periphery of the nut breaks at the axially outer end of such ring to form a circular break 30 and angles linearly and radially inwardly at approximately 10° to the axis thereof to form the centering dome 15 which provides a convenient slope for leading the key device K onto such centering dome 15 for axial alignment with the bearing ring 11. The slope of the centering dome 15 also serves to induce axial slipping therefrom of the jaws of vice grip pliers or the like which may be utilized by an unauthorized individual in attempt to remove the combination nut N. The dome 15 itself has an overall length of ½ inch to provide an adequate lead-on length, as well as contribute to the aesthetic appearance of the nut N.

It is particularly important in discouraging unauthorized removal of the nut N that the index facets 17 be disposed about the periphery of the bearing ring 11 in such a pattern and be of such a width that no facet or edge thereof is located diametrically opposite another facet, but is located only opposite an arcuate slip surface 19 to thus prevent an unauthorized individual from gripping index facets 17 or edges thereof located diametrically opposite one another with the jaws of vice grip pliers or the like, it being appreciated that with one jaw of the pliers being on a rounded slip surface 19, rotative forces applied thereto will tend to cause such plier jaw to slip therefrom. Any number of index facets 17 and pattern thereof desired may be selected provided a rounded slip surface 19 remains opposite each facet. In the preferred embodiment, three facets 17 are provided spaced slightly staggered 120 degrees from one another.

In order to facilitate registration of the key surfaces 21 of the key device K with the ring 11, the facets 17 project axially outwardly beyond the break 30 between such ring and the dome 15 to form respective facet feelers 32 about the base of such dome and in axial alignment with each of such index facets 17.

The key device K is in the form of a hollow cylindrical shell 31 having a 13/16 inch hex nut 33 formed on the closed end thereof for mating with a conventional tire wrench. The interior of such cylindrical shell 31 is in the form of a cylinder to closely overfit the slip surfaces 19 of the bearing ring 11 and is undercut at three locations about its periphery to form the flat index surfaces 21 for close mating with the index facets 17, such surfaces terminating at the open edges thereof in feeler edges 34, the purpose of which will appear hereinafter.

In operation, it will be appreciated that the combination nuts 11 are sold in sets to provide at least four such nuts for each set of wheels for a four-wheel car and at least a single key device K. The flat facets 17 are disposed in different angular arrangements, and if desired, in different widths, for different sets of theft resistant combination lug nut apparatus. One lug nut bore in each wheel is then drilled out to form a 0.70 inch diameter bore for receipt of the 0.70 inch diameter sleeve 25.

When a wheel is to be installed, the lug bores thereof are received over the lugs of the hub and conventional lug nuts installed on all lugs except for the one to receive the combination lug nut N. The lug nut N is screwed onto its receiving lug with the protective sleeve 25 projecting into the oversized lug bore and tightened finger tight. The key device K is then fitted telescopically over the centering dome 15 until the feeler edges 34 abut the side of such dome, it being appreciated that such centering dome facilitates axial alignment of such key device without concern as to the relative clocked positions between such key device and nut N. It will be apparent that when the facets 17 are located at approximately 120 degrees from one another as shown in FIG. 2, the rotational position of the key device K relative to the bearing ring 11 for receipt of the respective key surfaces 21 on the flat facets 17 will not be apparent from visual inspection. However, with the key device K maintained in position with the feeler edges 34 engaged against such dome, the key device may be rotated to the point where the various index surfaces align axially with the respective complementary feeler edges 32 to thus enable such key device to be telescoped fully over the ring 11.

The tire wrench may then be applied to the hex nut 31 on the key device K and such key device rotated, it being appreciated that since both the facets 17 and mating index surfaces 21 project axially with respect to the bearing ring 11, the forces represented by the vector arrows 41 in FIG. 4 will be fully tangential to the bearing ring 11 as represented by the vector arrows 43 (FIGS. 3 and 4) rather than being at an axial angle corresponding with the phantom vector arrow 45 which represents a force vector as might be applied if the facets 17 sloped axially outwardly and radially inwardly. Consequently, the reactive forces on the key device will be fully tangential thereto, thus assuring that no reactive axial forces are applied thereto which may tend to urge such key device axially outwardly, thus endangering dislodgement thereof from the nut N and consequent release resulting in banged knuckles of the operator and the consequent frustration of again necessitating alignment of the key device K over the nut N.

Once the combination lug nut N has been fully tightened, the key device K may be removed and stored in the trunk or glove compartment and will be available in the case of a flat tire or the like necessitating removal of the wheel locked in position by the nut N.

If, in the meantime, an unauthorized individual attempts to remove the lug nut N, it will be appreciated that access thereto from a radial direction with a pipe wrench or the like will be hindered by the surrounding wheel structure as a consequence of the hub portion of a wheel normally being recessed axially with respect to the peripheral rim thereof. Further, any attempt to grip the bearing ring 11 with the jaws of a pair of vice grip pliers or the like will result in at least one jaw of the pair being received on a slip surface 19 disposed diametrically opposite the respective opposed facets 17, thus causing such jaw to slip when torque is applied thereto and discouraging the thief's efforts. Further, attempts to grip the centering dome 15 will likewise be frustrated due to the taper thereof and the corresponding diametrical location of the facet feelers 32 with respect to the diametrically opposed rounded surface of the dome 15. In fact, I have received correspondence from various customers indicating that on occasions when they misplace their key device K, their own efforts to remove the combination lug nut N were rendered extremely difficult, oftentimes to the point of failure.

Various modifications and changes may be made with regard to the foregoing detailed description without departing from the spirit of the invention.

I claim:

1. A theft resistant combination lug nut apparatus for receipt on a threaded lug projecting coaxially through an oversize wheel bore and cooperating therewith to form an annulus and comprising:
   a nut including an internally threaded cylindrical sleeve projecting coaxially into said annulus, said nut projecting axially from said annulus to form an increased-in-diameter axially projecting cylindrical bearing ring, said ring being formed with a radially projecting annular shoulder facing axially toward said sleeve, said nut projecting axially outwardly beyond said ring to form a conically shaped axially elongated centering dome having its peripheral surface tapering axially outwardly and radially inwardly from said ring;
   a plurality of diametrically unopposed radially outwardly facing chordal index facets extending axially along the periphery of said ring parallel to the axis thereof and spaced about said bearing ring to form at locations opposite all said respective facets rounded slip surfaces;
   a key device formed with an open ended shell defining a cylindrical socket for closely overfitting said slip surfaces of said ring and formed on its interior with a plurality of key surfaces for complementally mating with said index facets on said ring; and
   wrench-receiving means on said key device whereby said nut may be telescoped loosely onto said centering dome to align said key device axially with said bearing ring and said key device rotated while centered on said dome to register said key surfaces with the complemental index facets on said ring and said key device then slipped axially onto said ring for positive engagement between said key device and ring and a wrench engaged on said wrench-receiving means and rotated to tighten said nut.

2. A theft resistant combination lug nut apparatus as set forth in claim 1 wherein:
   said centering dome tapers at an angle of substantially 10 degrees to the axis thereof.

3. A theft resistant combination lug nut apparatus as set forth in claim 1 wherein:
   said ring is formed with three chordal index facets; and
   said socket is formed with three flat key surfaces for complementally engaging said respective index facets.

4. A theft resistant combination lug nut apparatus as set forth in claim 1 wherein:
   said facets project axially outwardly from said ring onto said dome to form respective feeler facets for leading said index surfaces thereonto.

5. A theft resistant combination lug nut apparatus for receipt on a threaded lug projecting coaxially through an oversize wheel bore and cooperating therewith to form an annulus and comprising:
   a nut including an internally threaded cylindrical sleeve projecting coaxially into said annulus, said nut projecting axially from said annulus to form an increased-in-diameter axially projecting cylindrical bearing ring, said ring being formed with a radially projecting annular shoulder facing axially toward said sleeve, said nut projecting axially outwardly beyond said ring to form a conically shaped axially elongated centering dome;
   a plurality of diametrically unopposed radially outwardly facing chordal index facets extending axially along the periphery of said ring parallel to the axis thereof and spaced about said bearing ring to form at locations opposite all said respective facets rounded slip surfaces, said index facets projecting axially outwardly from said ring onto said dome to define respective feeler facets;
   a key device formed with an open ended shell defining a cylindrical socket for closely overfitting said slip surfaces of said ring and formed on its interior with a plurality of key surfaces for complementally mating with said index facets on said ring; and
   wrench-receiving means on said key device whereby said nut may be telescoped loosely onto said centering dome to align said key device axially with said bearing ring and said key device rotated while centered on said dome to register said key surfaces with the complemental index facets on said ring and said key device then slipped axially onto said ring for positive engagement between said key device and ring and a wrench engaged on said wrench-receiving means and rotated to tighten said nut.

6. A theft resistant combination lug nut apparatus as set forth in claim 5 wherein:
   said ring is formed with three chordal index facets; and
   said socket is formed with three flat key surfaces for complementally engaging said respective index facets.

* * * * *